US012216305B2

(12) United States Patent
Tong et al.

(10) Patent No.: US 12,216,305 B2
(45) Date of Patent: Feb. 4, 2025

(54) TERMINALS ENGAGED LIGHT GUIDE PLATE AND FRONT LIGHT MODULE THEREOF

(71) Applicant: GLOBAL LIGHTING TECHNOLOGY INC., Taoyuan (TW)

(72) Inventors: Jin-Wei Tong, Taoyuan (TW); Hao Lu, Taoyuan (TW); Fan-Wei Wu, Taoyuan (TW); Wei-Lun Huang, Taoyuan (TW)

(73) Assignee: GLOBAL LIGHTING TECHNOLOGY INC., Taoyuan (TW)

( * ) Notice: Subject to any disclaimer, the term of this patent is extended or adjusted under 35 U.S.C. 154(b) by 47 days.

(21) Appl. No.: 18/207,157

(22) Filed: Jun. 8, 2023

(65) Prior Publication Data

US 2024/0085611 A1 Mar. 14, 2024

(30) Foreign Application Priority Data

Sep. 13, 2022 (TW) .................................. 111134540

(51) Int. Cl.
*F21V 8/00* (2006.01)
*G06F 3/041* (2006.01)
(52) U.S. Cl.
CPC ......... *G02B 6/0028* (2013.01); *G02B 6/0031* (2013.01); *G02B 6/0073* (2013.01); *G06F 3/0412* (2013.01)

(58) Field of Classification Search
CPC ... G06F 3/0412; G02B 6/0028; G02B 6/0031; G02B 6/0073
See application file for complete search history.

(56) References Cited

U.S. PATENT DOCUMENTS

| 8,651,725 | B2* | 2/2014 | Ie ........................ | G02B 6/0068 |
| | | | | 362/616 |
| 9,743,486 | B2* | 8/2017 | Chuang ................. | G06F 1/3203 |
| 10,234,621 | B2* | 3/2019 | Park ..................... | G02B 6/0076 |
| 11,163,107 | B2* | 11/2021 | Masuda ............... | G02B 6/0068 |

* cited by examiner

*Primary Examiner* — Arman B Fallahkhair
(74) *Attorney, Agent, or Firm* — Fei-hung Yang

(57) ABSTRACT

A front light module includes a light guide sheet and a light bar. The light guide sheet has two light receiving laterals, a fold line, a first pattern area, and a second pattern area respectively located on two sides of the fold line. One light receiving lateral is protruded to form first taper sets, and the other is protruded to form second taper sets. The second pattern area is superimposed on the first pattern area, and the first and second tapers set are engaged and coplanar to form a light incident surface after folding along the fold line. The light bar provides light toward the light incident surface, the first pattern area is lit by the odd positions of the light bar via the first taper sets, and the second pattern area is lit by the even positions of the light bar via the second taper sets.

6 Claims, 13 Drawing Sheets

TERMINALS ENGAGED LIGHT GUIDE PLATE AND FRONT LIGHT MODULE THEREOF

CROSS-REFERENCE TO RELATED APPLICATIONS

This non-provisional application claims priority under 35 U.S.C. § 119(a) on Patent Application No(s). 111134540 filed in Taiwan, R.O.C. on Sep. 13, 2022, the entire contents of which are hereby incorporated by reference.

BACKGROUND

Technical Field

The present disclosure relates to light guide products, and more particularly to a front light module.

Description of Related Art

A front light module refers to a light supply product placed in front of a display device, which can be equipped with a touch circuit substrate to provide a touch function and form a touch panel product simultaneously. Wherein, the touch panel product is commonly found in notebook computers and electronic reading devices, while a touch panel having a front light module can also be found in other portable devices.

When discussing the application of the touch panel products, the basic requirement usually is always providing a basic key guidance function while presenting a good aesthetic appearance. That is, to some extent, each key character should have an uniform luminous, and this displaying function would be closely related to the front light module. In addition, if the manufacturing/production costs can be taken into account while meeting the requirements for performance to achieve better and more diverse light output uniformity with fewer parts or lower cost, the overall performance and competitiveness of the product can be greatly enhanced. However, most of the existing products simply use a lot of components to achieve the uniformity and the diversity of light performance, or sacrifice the diversity of light or the appearance to reduce the cost, so there is no product out there in the market that combines the advantages of low cost, diversity and better light uniformity.

SUMMARY

In view of the aforementioned drawbacks of the related art, the inventor of the present disclosure based on years of experience in the related industry to conceive and provide a terminals engaged light guide plate and its front light module, in hope of providing the optical products with excellent light-emitting effects such as low manufacturing cost and high diversification.

In one aspect of the disclosure, a front light module is disclosed to achieve the single-sided light input effect and switch the application to display various different patterns, so as to achieve the effects of greatly reducing the cost and difficulty of production, while providing good diversification and excellent light uniformity performance.

In one embodiment of the aspect, the front light module is installed on a touch circuit substrate. The front light module includes a first light guide sheet, a second light guide sheet, and a light bar. The first light guide sheet is laid on the touch circuit substrate, the first light guide sheet includes a first light receiving lateral having a plurality of first taper sets, an edge of the first light receiving lateral is protruded to form the first taper sets, and a first pattern area is defined on a surface of the first light guide sheet. The second light guide sheet is superimposed on the first light guide sheet and includes a second light receiving lateral having a plurality of second taper sets, an edge of second light receiving lateral is protruded to form the second taper sets, the second taper sets and the first taper sets are engaged in a staggered and coplanar manner to form an incident plane, and a second pattern area is defined on a surface of the second light guide sheet. The light bar is formed by arranging an odd-positioned light source group and an even-positioned light source group to provide light toward the incident plane, the odd-position light source group is configured to be corresponsive to the first taper sets, and the even-positioned light source group is configured to be corresponsive to the second taper sets.

Whereby, when the odd-position light source group functions, the first pattern area is lit by the light from the first taper sets, and when the even-positioned light source group functions, the second pattern area is lit by the light from the second taper sets.

In another embodiment of the aspect, the light guide sheet includes a sheet body, a plurality of first taper sets and a plurality of second taper sets. The sheet body of the light guide sheet includes a pair of light receiving laterals, a fold line, a first pattern area and a second pattern area, the first pattern area and the second pattern area are located on both sides of the fold line respectively, and the fold line is parallel to the aforementioned two light receiving laterals and provided for the sheet body to be folded along the fold line and make the two light receiving laterals to be superimposed on each other on the side of the sheet body, and the second pattern area is superimposed on the first pattern area. The first taper sets are formed by protruding an edge of one light receiving lateral, and the second taper sets are formed by protruding an edge of another light receiving lateral. The first taper sets and the second taper sets are engaged with each other in a staggered manner to form an incident plane. Whereby, the first pattern area is lit by the odd-position light source group of the light bar corresponding to the first taper sets and the second pattern area is lit by the even-positioned light source group of the light bar corresponding to the second taper sets.

In other words, the first taper sets and the second taper sets are located at both ends of the sheet body respectively, and after the sheet body is folded along the fold line, the first pattern area and the second pattern area are superimposed on each other, and the plurality of first taper sets and the plurality of second taper sets are engaged with each other in a staggered manner to form an incident plane which is configured to be corresponsive to the light bar on the touch circuit substrate, so as to achieve a framework that can light up two layers of the light guide sheet by one light bar.

In another embodiment of the aspect, the light guide sheet includes a sheet body, a plurality of first taper sets and a plurality of second taper sets. The sheet body of the light guide sheet includes a pair of light receiving laterals, a fold line, a first pattern area and a second pattern area, the first pattern area and the second pattern area are located on both sides of the fold line respectively, the fold line is perpendicular to the two light receiving laterals and provided for folding the sheet body along the fold line to make the two light receiving laterals to be superimposed on each other on the same side of the sheet body, and the second pattern area is superimposed on the first pattern area. The first taper sets are formed by protruding an edge of the light receiving lateral, and the second taper sets are formed by protruding an edge of another light receiving lateral. The first taper sets and the second taper sets are engaged with each other in a staggered manner to form an incident plane. Whereby, the first pattern area is lit by the odd-position light source group of the light bar corresponding to the first taper sets and the second pattern area is lit by the even-positioned light source group of the light bar corresponding to the second taper sets.

In other words, the taper sets can be arranged one by one on the same side of the sheet body, or divided and defined as a plurality of first taper sets and a plurality of second taper sets, the fold line is perpendicular to the first light receiving lateral and the second light receiving lateral, such that after the sheet body is formed to produce a first light guide sheet and a second light guide sheet, the first light receiving lateral and the second light receiving lateral are located on the same side and coplanar to form a light incident surface.

In an embodiment of the aspect, the first taper sets and the second taper sets are located on the same side of the sheet body, and such arrangement is conducive to cutting and forming the taper sets by a die-cut mold. In other words, during a die-cut, there is no need to adjust two sets of blades on both sides, but it only needs to reserve a folding space near the fold line on the same side of the die-cut mold in order to cut and form the first taper sets and second taper sets. In addition, the first taper sets and second taper sets are conical structures located on the light receiving lateral and can be designed and cut by the die-cut mold and then formed by extrusion to provide a better, convenient, and fast manufacturing process for production. However, if injection molding is used to manufacture the light guide plate, this ingenious idea will not be needed.

Further, the plurality of taper sets can also be subdivided into a plurality of groups corresponding to the plurality of light sources to control the light source of the light bar and achieve the multi-segment display, multi-color temperature, layering, and light mixing functions.

In another embodiment of the aspect, the thickness of the light guide sheet is much smaller than the light emitting area of the light bar. In the idea of designing a structure that simultaneously provides two or more light guide sheets in a same light bar, it may not be necessary to design the same light guide sheet to be folded and superimposed through the fold line, but a plurality of light guide sheets is directly stacked. In such case, the lowermost light guide sheet and the uppermost light guide sheet alternatively receives the downward and upward light that deviate from the main optical axis of the light bar via the taper sets correspondingly, and one to three ordinary light guide sheets without the taper sets can still be sandwiched between the lowermost and uppermost light guide sheets to receive the light that a near the main optical axis of the light bar via the laterals of each other. The ordinary light guide sheet only needs to cut out a light receiving lateral with a staggered groove-bump-groove structure, in order to use the upwardly protruding taper sets by the lowermost light guide sheet which is accommodated in a groove on one side of the bump, and the downwardly protruding taper sets by the uppermost light guide sheet can be accommodated in a groove on the other side of the bump.

In the other embodiments of the aspect, the front light module further includes a plurality of light barriers located on at least one lateral side of each second taper sets to enhance the light isolation effect, and provide a more accurate display of the first pattern area and the second pattern area. In other words, the light source groups at different positions will not interfere with each other, but will accurately light up the corresponding taper sets. Further, each light barrier can be a lightproof glue or a black ink to facilitate the manufacturing and production and obtain a better light isolation effect.

In addition, to enhance the assembly stability and avoid unexpected lighting, the front light module further includes a relay ink structure or a semi-penetrating reverse layer installed between the first light guide sheet and the second light guide sheet. The relay ink structure is sequentially stacked from bottom to top with a first transparent ink layer, a first black ink layer, a transparent adhesive layer, a second black ink layer, and a second transparent ink layer.

In order to take into account the front light module is covered onto the front and directly touched and viewed by users, the front light module further includes a multi-layered stack-structured protective cover covered on the second light guide sheet and having a glass substrate, a sputtering layer, an anti-glare film layer, and a reflective layer, wherein the sputtering layer is located on the upper surface of the glass substrate, the anti-glare film layer is located on the lower surface of the glass substrate, and the reflective layer is located under the anti-glare film layer, to achieve the protective function.

In another aspect of the disclosure, a terminals engaged light guide plate is disclosed. The terminals engaged light guide plate can be applied to a front light module and laid on a touch panel or an electronic book reader.

In one embodiment of the aspect, the terminals engaged light guide plate includes a first light guide sheet and a second light guide sheet. A plurality of first taper sets is formed and protruded from an end of the first light guide sheet, and the second light guide sheet and the first light guide sheet are superimposed on each other, and a plurality of second taper sets is formed and protruded from an end of the second light guide sheet. The second taper sets and the first taper sets are next to each other and coplanar to form a light incident surface. Specifically, in another embodiment, the double-layer light guide sheet structure is a double-layer structure formed by folding a bending part, or inserted into two slots of an U type bending unit.

In other words, this embodiment, not just limited to applications of the front light module, can be regarded as a simple technology of the laminated light guide sheet. For example, in another embodiment, the terminals engaged light guide plate further includes a reflective sheet sandwiched between the first light guide sheet and the second light guide sheet, thereby forming a light guide sheet module that can be used for decoration and illumination. As described above, there can be another embodiment of the terminals engaged light guide plate, which has many light barriers designed and sequentially installed between the adjacent first taper sets group and second taper sets group to enhance the segmented display effect. In another embodiment, the terminals engaged light guide plate further includes a semi-penetrating reverse layer sandwiched between the first light guide sheet and the second light guide sheet to improve the layering contrast effect.

In another embodiment of the aspect, the terminals engaged light guide plate includes a first light guide sheet, a second light guide sheet, and a third light guide sheet. A plurality of first taper sets is formed and protruded from an end of the first light guide sheet, the second light guide sheet and the first light guide sheet are superimposed on each other, and a plurality of second taper sets is formed and protruded from an end of the second light guide sheet. A third light guide sheet is sandwiched between the first light guide sheet and the second light guide sheet, and an end of the third light guide sheet is formed by arranging a plurality of light incident blocks and a plurality of accommodating grooves in a staggered manner. For instance, one side of each light incident block is an accommodating groove provided for embedding one protrusion of the first taper sets, and another side of the light incident block is also an accommodating groove provided for embedding one protrusion of the second taper sets, such that many protrusions of the first taper sets, the light incident blocks and many protrusions of the second taper sets are sequentially arranged coplanar to form a light incident surface.

In other words, the three-layer light guide sheet stacked structure can be an elongated light guide sheet formed by folding along two fold lines lines and thus having two bending parts to produce a three-layer structure, or formed by stacking three independent light guide sheets with one another, or inserting three light guide sheets into two U type bending units with slots. To display the patterns of press keys, characters, function keys, etc. independently on the three-layer light guide sheet, the technical concept is to form the pattern area by optical dots, and each of the first, second, and third light guide sheets has its corresponding light source group.

In the single light bar structure, the terminals engaged light guide plate can support a five-layer stacked light guide sheet, such as a structure, from top to bottom, having a first-layer light guide sheet with a taper sets protruding downward, a second-layer light guide sheet with a taper sets or a bump at the light incident position and protruding downward, a third-layer light guide sheet with a light receiving lateral in a bump structure, and a groove is reserved on a side of the bump for accommodating the taper sets of the first-layer light guide sheet and the second-layer light guide sheet. When the light incident structure of the second-layer light guide sheet is a bump rather than a taper sets, a corresponding air gap is formed. Similarly, a groove is reserved on another side of the bump of the third-layer light guide sheet for accommodating the upwardly protruding taper sets of the fourth-layer light guide sheet and the fifth-layer light guide sheet. When the light incident structure of the fourth-layer light guide sheet is a bump rather than a taper sets, a corresponding air gap is formed. In this way, the taper sets can compensate the misalignment between the light incident position of the upper or lower light guide sheet and the main light axis of the corresponding light source, and the air gap can significantly reduce the oblique angle of incoming light from non-corresponding light sources.

In the other embodiment of the aspect, the terminals engaged light guide plate further includes a plurality of light barriers sequentially arranged between the adjacent first taper sets, each layer of light incident block, and the second taper sets to enhance the light isolation effect, such that each layer of light guide sheet is lit only by the corresponding light source group. Similarly, as described above, there can be another embodiment of the terminals engaged light guide plate and further includes first and second reflective sheets, the first reflective sheet is sandwiched between the first light guide sheet and the second light guide sheet, and the second reflective sheet is sandwiched between the second light guide sheet and the third light guide sheet to form a decorative and illumination product. The terminals engaged light guide plate can be implemented in another embodiment which further comprises a first semi-penetrating reverse layer and a second semi-penetrating reverse layer, the first semi-penetrating reverse layer is sandwiched between the first light guide sheet and the second light guide sheet, and the second semi-penetrating reverse layer is sandwiched between the second light guide sheet and the third light guide sheet to enhance the segmented display effect.

In the structure of dual light bars, the elongated light guide sheet can be folded three times to form four layers, and then the elongated light guide sheet can be cut by the die-cut mold to form four taper sets groups protruded on the same side and toward the same direction. When the taper sets are stacked, they are arranged in pairs and embedded with each other; in other words, in the application of the elongated light guide sheet folded and stacked to form a four-layer structure, two light bars of different heights can be used to light up the four-layer pattern areas on the same side. In the single-sided design with two side-by-side light bars, the elongated light guide sheet can be cut by the die-cut mold into four taper sets groups protruding toward the same direction, and when this light guide sheet is used in a luminous art device, four patterns on different layers can be lit up layer by layer.

In summation of the description above, the terminals engaged light guide plate of the present disclosure and its front light module provide optical products that come with a single-sided light incident configuration and can switch to display different patterns. In addition to reducing production costs and time through simpler and more controllable structural characteristics, these products also maintain excellent light output uniformity. The present disclosure proposes various solutions based on the same technical concept, which can be achieved through folding, superimposing, and layering the sheet materials with the staggered taper sets to form a coplanar single-sided incident plane. By the method of providing light to the taper sets at different positions, the effect of lighting up different patterns can be achieved when at least one of the odd and even-positioned light source groups on the light bar functions. The present disclosure further provides numerous examples of other technical characteristics that can be added to improve the functionality of the front light module as described in the preceding paragraphs.

DESCRIPTION OF THE EMBODIMENTS

The technical characteristics of the present disclosure will become apparent in the following detailed description of the preferred embodiment with reference to the accompanying drawings.

To overcome existing technological deficiencies and provide a layered light guide sheet product with excellent performance in all aspects for the relevant market, the present discloser provides a terminals engaged light guide plate and its front light module, and this illumination display structure allows the switching to different patterns using a single-sided light incident design, and effectively reduces the quantity of required components and the manufacturing cost while improving the assembling speed, maintaining excellent light uniformity performance and achieving a better application efficiency. The specific technical characteristics of the front light module will be explained in the following paragraphs and relevant figures. It is noteworthy that the contents illustrated in the figures are provided for the purpose of illustrating the technical characteristics of the present disclosure, the figures do not represent actual size, proportion, or shape, etc., and they are not intended for limiting the scope of the present disclosure.

Figure 1A:
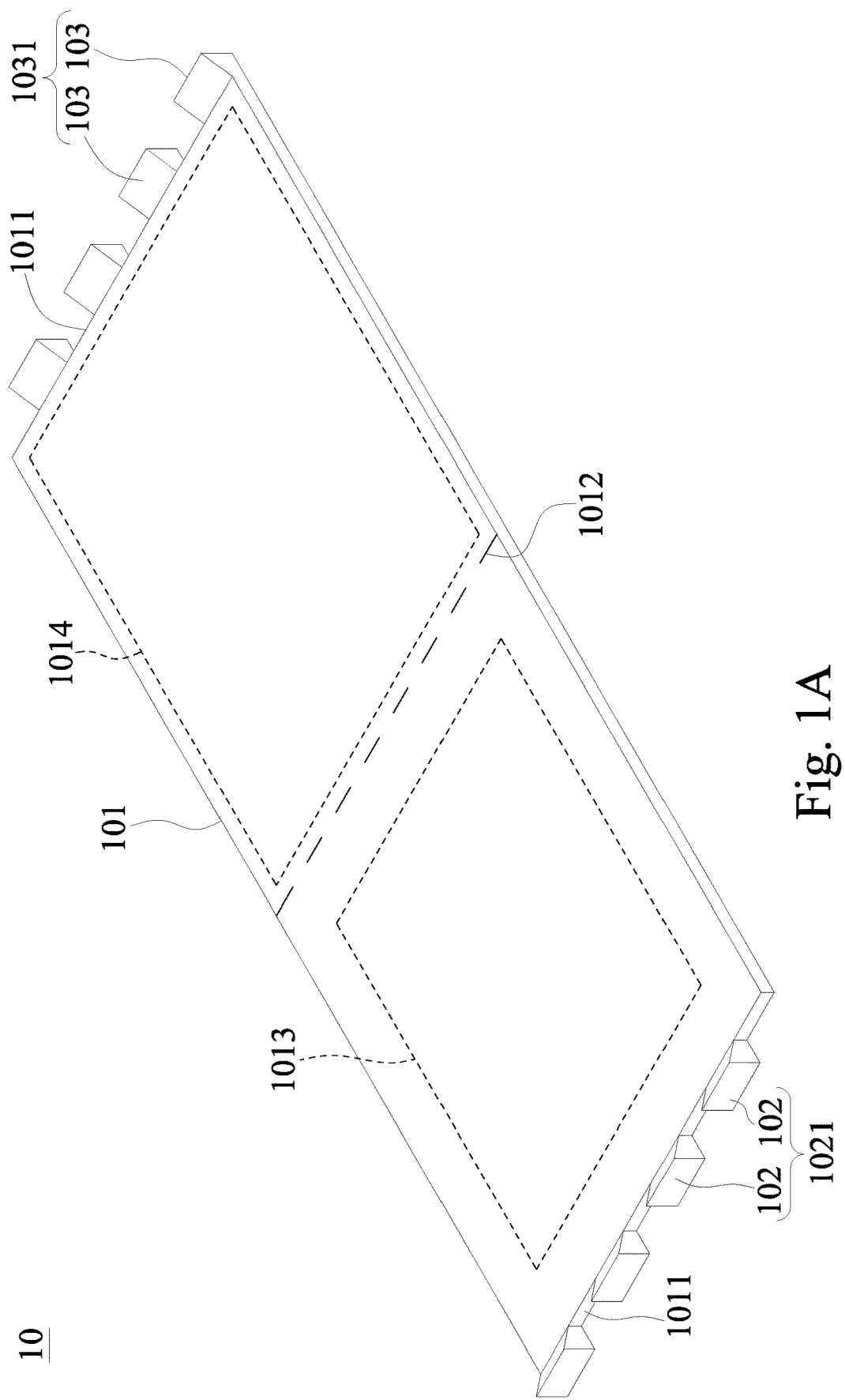
FIG. 1A is a schematic view of a light guide sheet before a sheet body is folded in half in accordance with a first embodiment of this disclosure.
Figure 1B:
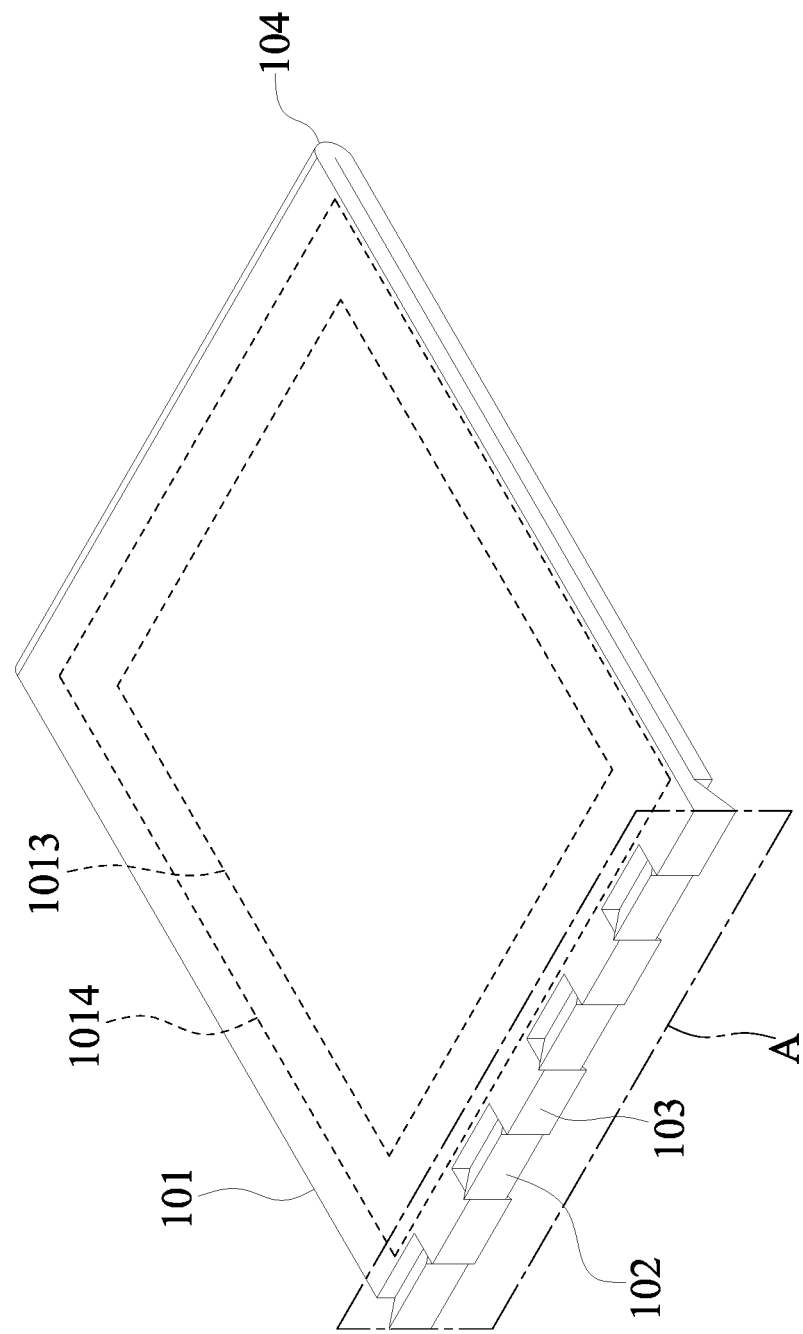
FIG. 1B is a schematic view of a light guide sheet after a sheet body is folded in half in accordance with the first embodiment of this disclosure.
Figure 2:
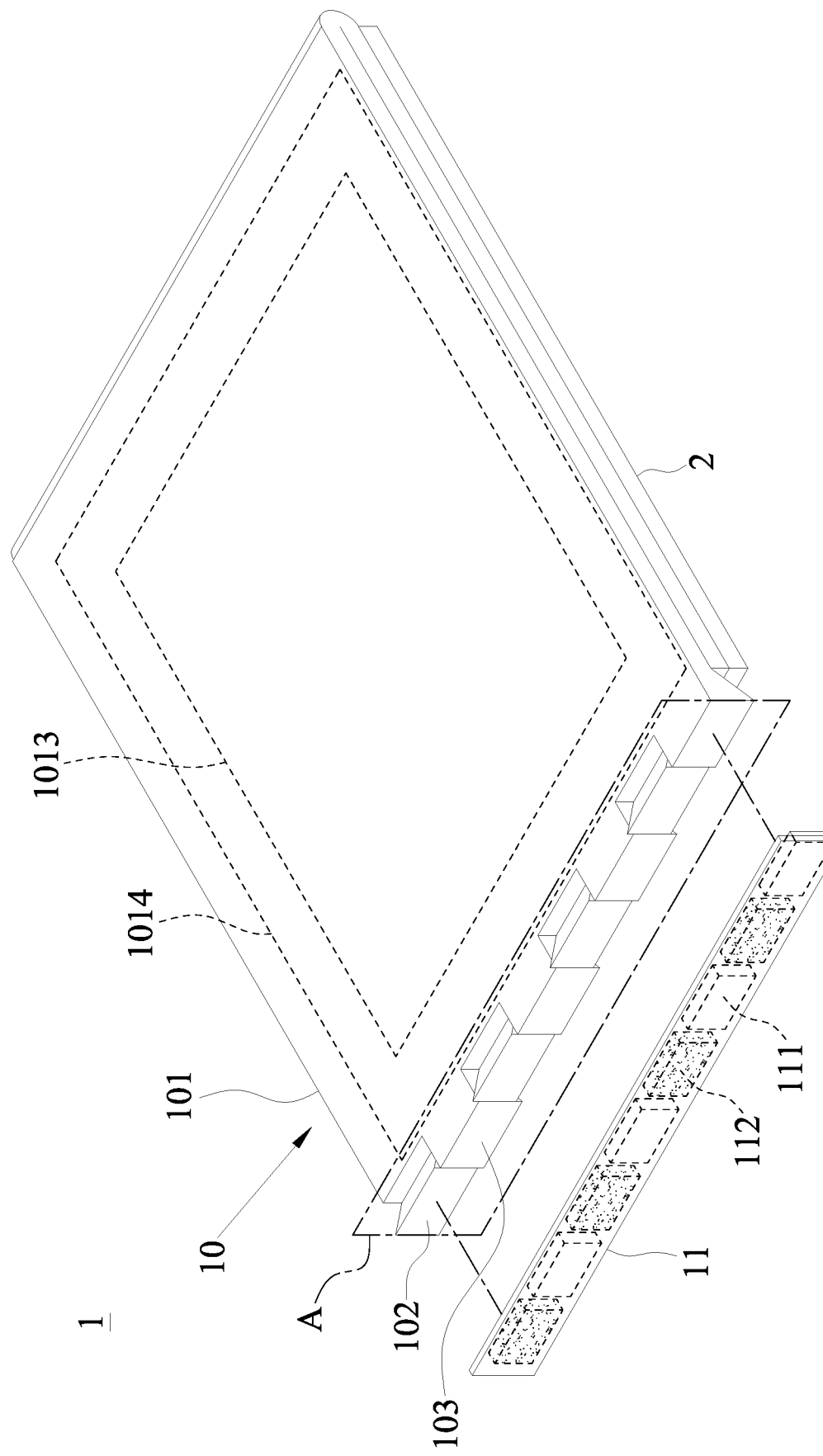
FIG. 2 is a schematic view of a front light module in accordance with the first embodiment of this disclosure.

With reference to FIGS. 1A, 1B, and 2 for the schematic views of a sheet body of a light guide sheet before and after being folded in half and the schematic view of a front light module in accordance with a first embodiment of the present disclosure respectively, in an embodiment of the technical mode of a terminals engaged light guide plate installed in a front light module, the front light module 1 is installed on a touch circuit substrate 2 and includes a light guide sheet 10 and a light bar 11. The light guide sheet 10 is laid on the touch circuit substrate 2 and includes a sheet body 101, a plurality of first taper sets 102 and a plurality of second taper sets 103.

The sheet body 101 includes a pair of light receiving laterals 1011, a fold line 1012, a first pattern area 1013, and a second pattern area 1014. The first pattern area 1013 and the second pattern area 1014 are located on both sides of the fold line 1012 respectively, the fold line 1012 is parallel to the light receiving lateral 1011 and provided for folding the sheet body 101 along the fold line, such that the light receiving lateral 1011 is superimposed on the same side of the sheet body 101, and the second pattern area 1014 is superimposed on the first pattern area 1013. The first pattern area 1013 and the second pattern area 1014 have various microstructures such as dot patterns according to the requirements to display the desired pattern. In addition, the sheet body 101 can be made of an ultra-thin plastic sheet with a thickness ranging from 0.05 mm to 0.15 mm to effectively reduce the overall thickness and achieve a slim effect.

The first taper sets 102 is formed by protruding an edge of a light receiving lateral 1011, the second taper sets 103 is formed by protruding an edge of another light receiving lateral 1011, and the first taper sets 102 and the second taper sets 103 are arranged in a staggered manner to form an incident plane A. The first taper sets 102 and the second taper sets 103 refer to the structures of receiving light, and the structures formed by outwardly protruding the pair of light receiving laterals 1011 and having a cross-section in a trapezium shape. In particular, the light guide sheet 10 of the front light module 1 is a thin sheet, which is also the incident plane A formed by the first taper sets 102 and second taper sets 103 provided for increasing the amount of receiving light, and allowing the light guide sheet 10 to have a uniform and sufficiently clear pattern display.

In FIG. 1A, it can be seen that the fold line 1012 is arranged in parallel with the light receiving lateral 1011, the first taper sets 102 are arranged at intervals in any one of the light receiving laterals 1011, the second taper sets 103 are arranged at intervals in another light receiving lateral 1011, and the second taper sets 103 and the first taper sets 102 are misaligned, so that after the sheet body 101 is folded in half along the fold line 1012, the second taper sets 103 and the first taper sets 102 form a staggered structure as shown in FIG. 1B. In other words, the partitioned part of the sheet body 101 of the light guide sheet 10 corresponding to the fold line 1012 can be regarded as having the first light guide sheet with the first pattern area 1013 and the second light guide sheet with the second pattern area 1014. The first taper sets 102 and second taper sets 103 that can be counted one by one in details can also be regarded as a first taper sets group 1021 and a second taper sets group 1031 respectively, and the first taper sets group 1021 is located at an end of the first light guide sheet, and the second taper sets group 1031 is located at an end of the second light guide sheet. After the sheet body 10 is folded in half, a bending part 104 is formed at a position corresponding to the fold line 1012, such that the first light guide sheet and the second light guide sheet make the first pattern area 1013 and the second pattern area 1014 to be superimposed on each other in correspondence with the bending part 104, and the first taper sets group 1021 and the second taper sets group 1031 are embedded and arranged in a staggered and coplanar manner to form a light incident surface. In this implementation mode, the light guide sheet further includes a plurality of light barriers (not shown in the figure) sequentially installed between the adjacent first taper sets group 1021 and second taper sets group 1031 to improve the light isolation effect and provide accurate lighting.

Figure 3:
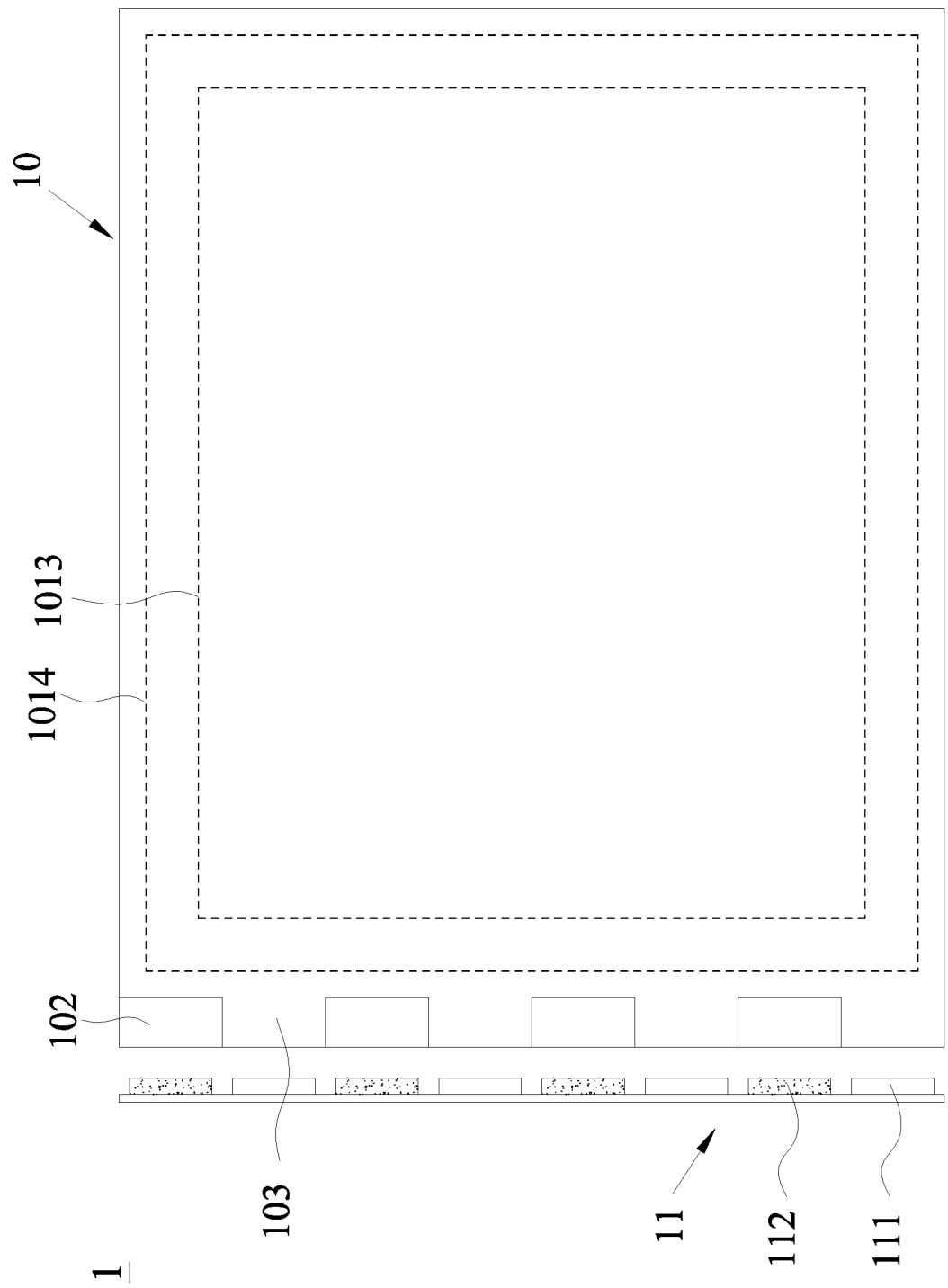
FIG. 3 is a plan view of a front light module in accordance with the first embodiment of this disclosure.

In FIG. 2, the light bar 11 is formed by arranging an odd-positioned light source group 111 and an even-positioned light source group 112 to provide light toward the incident plane A. The odd-position light source group 111 is configured to be corresponsive to the first taper sets 112 and the even-positioned light source group 112 is configured to be corresponsive to the second taper sets 103. In this way, when the odd-positioned light source group 111 functions, the first pattern area 1013 is lit by the light from the first taper sets 102, and when the even-positioned light source group 112 functions, the second pattern area 1014 is lit by the light from the second taper sets 103. With reference to FIG. 3 for the plan view of a front light module in accordance with an embodiment of the present disclosure, the status of the odd-positioned light source group 111 corresponds to the first taper sets 102, the status of the even-positioned light source group 112 corresponds to the second taper sets 103, and the first taper sets 102 are located nearer to the light receiving lateral 1011 of the first pattern area 1013, so that when the odd-positioned light source group 1111 functions, the first pattern area 1013 is lit by the first taper sets 102. Similarly, the second taper sets 103 are located nearer to the light receiving lateral 1011 of the second pattern area 1014, so that when the even-positioned light source group 112 functions, the second pattern area 1014 is lit by the second taper sets 103, so as to achieve the effect of displaying different patterns by controlling the operation of the light bar 11.

The front light module 1 uses the thinner sheet body 101 after being folded in half to make the pair of light receiving laterals 1011 to be superimposed on the same side, and allow the first taper sets 102 and the second taper sets 103 to be engaged with each other in a staggered manner to form an incident plane A and constitute a single-sided light incident structure. The odd-positioned light source group 111 and the first taper sets 102 are configured to be corresponsive to a part of the light bar 11 to provide light to such part of the light bar 11, and the even-positioned light source group 112 and the second taper sets 103 are configured to be corresponsive to a part of the light bar 11 to provide light to such part of the light bar 11. By controlling the operation of different light source groups, a desired pattern area can be lit up to achieve the structure of a light bar that can light up two layers of light guide sheets. This arrangement significantly reduces the quantity and cost of the required components and allows quick production with simple manufacturing and assembling methods, while maintaining a thin design and displaying all pattern areas clearly. Of course, in this structure, the number of pattern areas can be further increased depending on actual application requirements, and the first taper sets 102 and the second taper sets 103 can be used for a more detailed correspondence. For example, a part of the first taper sets 102 can be used to light up any pattern area, and a part of the first taper sets 102 can be used to light up another pattern area; and a part of the second taper sets 103 can be used to light up the other pattern area, and a part of the second taper sets 103 can be used to light up a further pattern area, so as to achieve the function of displaying various patterns.

As to the sheet body 101 of the light guide sheet 10, the first taper sets 102 and the second taper sets 103 can be manufactured into conical structures on the light receiving lateral 1011 which are formed after the cutting by a die-cut mold. More specifically, the light receiving lateral 1011 of the sheet body 101 can be formed into a continuous conical structure first, and then cut according to the required number of first taper sets 102 and second taper sets 103, and the first taper sets 102 and the second taper sets 103 can be formed at the positions of the light receiving lateral 1011 to provide a more convenient manufacturing process and a faster processing speed.

Figure 4A:
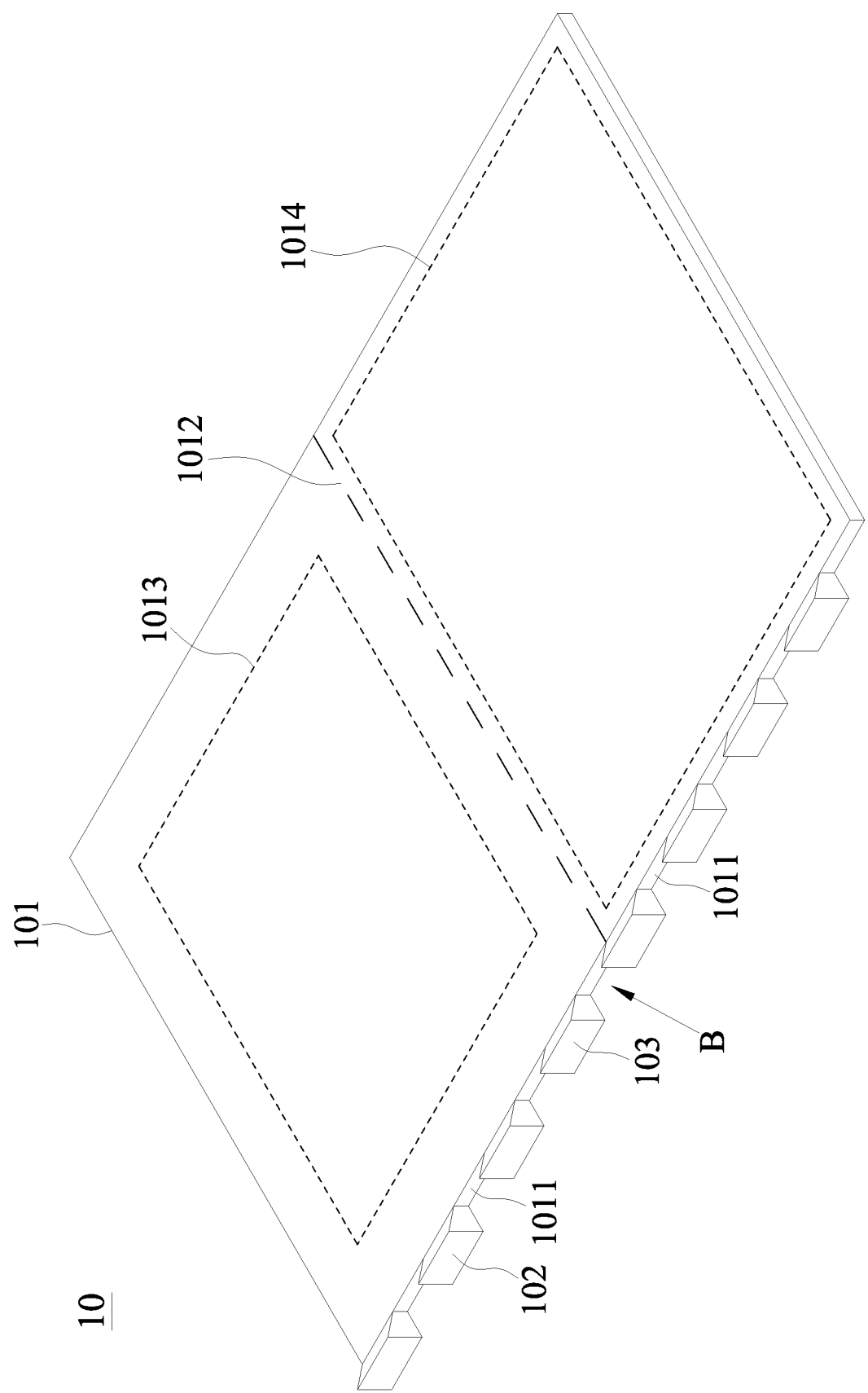
FIG. 4A is a schematic view of a light guide sheet before a sheet body is folded in half in accordance with a second embodiment of the present disclosure.
Figure 4B:
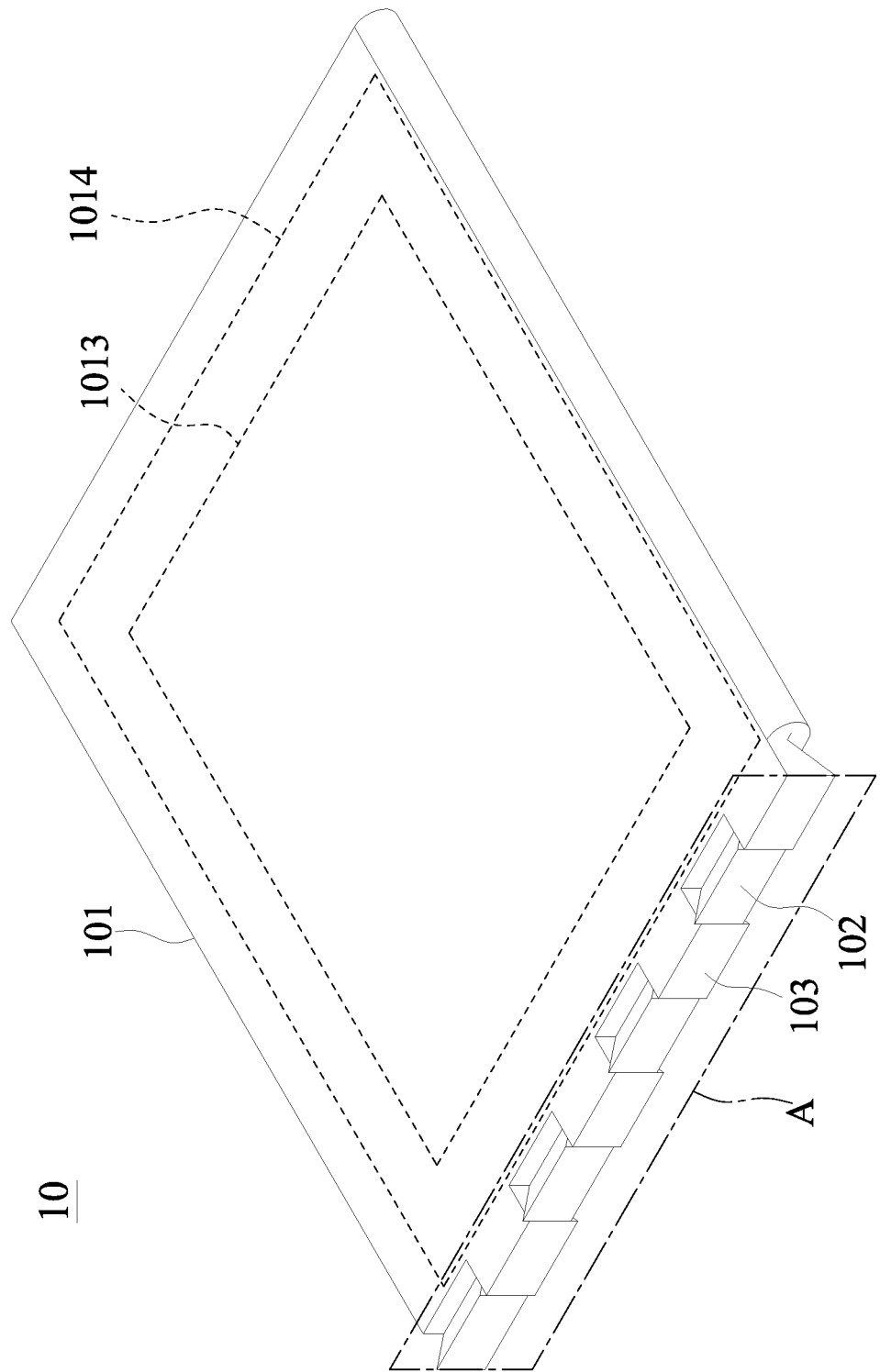
FIG. 4B is a schematic view of a light guide sheet after a sheet body is folded in half in accordance with the second embodiment of the present disclosure.
Figure 5:
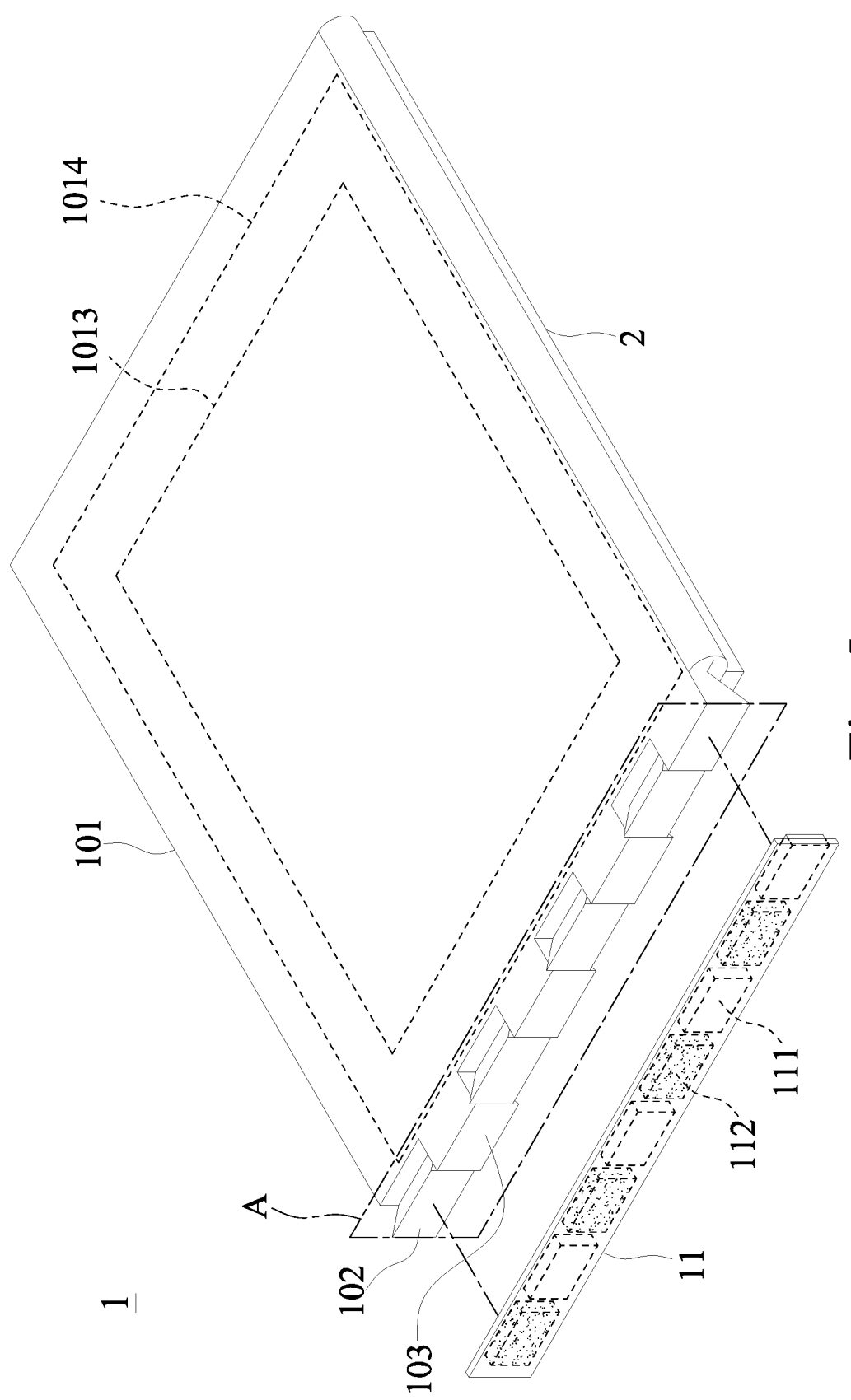
FIG. 5 is a schematic view of a front light module in accordance with the second embodiment of the present disclosure.

Based on the same technical concept, the present disclosure also provides another embodiment of the terminals engaged light guide plate applied to a front light module. With reference to FIGS. 4A, 4B and 5 for the schematic views of a sheet body of a light guide sheet before and after being folded in half and a schematic view of a front light module in accordance with a second embodiment of the present disclosure respectively, the front light module 1 is also installed to a touch circuit substrate 2 and includes a light guide sheet 10 and a light bar 11. The light guide sheet 10 is laid on the touch circuit substrate 2 and includes a sheet body 101, a plurality of first taper sets 102, and a plurality of second taper sets 103.

The sheet body 101 includes a pair of light receiving laterals 1011, a fold line 1012, a first pattern area 1013, and a second pattern area 1014. The first pattern area 1013 and the second pattern area 1014 are located on two opposite sides of the fold line 1012 respectively, the light receiving lateral 1011 is also located on two opposite sides of the fold line 1012, and the fold line 1012 is vertical to the light receiving lateral and provided for folding the sheet body 101 in half corresponding to the fold line, such that the light receiving lateral 1011 is stacked on the same side of the sheet body 101, and the second pattern area 1014 is superimposed on the first pattern area 1013. The first taper sets 102 are formed by protruding an edge of any one of the light receiving laterals 1011, the second taper sets 103 are formed by protruding an edge of another light receiving lateral 1011, and the first taper sets 102 and the second taper sets 103 are arranged in a staggered manner to form an incident plane A.

In FIG. 4A, the fold line 1012 is perpendicular to the light receiving lateral 1011, the pair of light receiving laterals 1011 are disposed on the same side of the sheet body 101 and corresponding to the partition of the fold line 1012, and the first pattern area 1013 and the second pattern area 1014 are located on both sides of the fold line 1012 respectively. After the sheet body 101 is folded in half along the fold line 1012 and in a direction from right to left as shown in the figure, and the light receiving laterals 1011 are superimposed on each other on the same side of the sheet body 101, and the first taper sets 102 and the second taper sets 103 are arranged in a staggered manner as shown in FIG. 4B.

In FIG. 5, the light bar 11 is formed by arranging an odd-positioned light source group 111 and an even-positioned light source group 112 to provide light toward the incident plane A, and the odd-positioned light source group 111 is configured to be corresponsive to the first taper sets 102 and the even-positioned light source group 112 is configured to be corresponsive to the second taper sets 103. In this way, when the odd-positioned light source group 111 functions, the light from the first taper sets 102 light up the first pattern area 1013, and when the even-positioned light source group 112 functions, the light from the second taper sets 103 light up the second pattern area 1014. Similarly, when the light bar 11 and the light guide sheet 10 are used together, the odd-positioned light source group 111 and the even-positioned light source group 112 functioned by the control of the light bar 11 can achieve the single-sided light input effect and display various different patterns. FIG. 3 clearly shows the corresponding relationship of the odd-positioned light source group 111 and even-positioned light source group 112 with the first taper sets 102 and second taper sets 103, and the only difference compared with FIG. 5 is that the fold line 1012 in this embodiment is located on the right side. The rest of the technical characteristics and details of each component has been described in the preceding paragraphs and will not be repeated.

Similarly, the first taper sets 102 and the second taper sets 103 in this embodiment can also be formed by cutting the conical structure on the light receiving lateral 1011 by a die-cut mold to effectively improve the convenience and manufacturing speed of the manufacturing process. In an embodiment of the aspect, the first taper sets group formed by a plurality of first taper sets 102 and the second taper sets group formed by a plurality of second taper sets 103 are located on the same side of the sheet body, and such arrangement facilitates the cutting and formation of the taper sets by the die-cut mold. In other words, during the cutting by the die-cut mold, there is no need to adjust the two set of blades on both sides, and only a space near the fold line is needed to be reserved on the same side of die-cut mold, in order to simultaneously form the first taper sets 102 and the second taper sets 103 by cutting. In addition, the sheet body 101 can be folded in half along the fold line 1012, so that a reserved folding space B can be formed between the light receiving lateral 1011 or any position of the light receiving lateral 1011 by the die-cut mold. If the first taper sets 102 and second taper sets 103 are also formed by the die-cut mold, it can be done simultaneously in a single process, thereby improving the speed and convenience of the manufacturing process. Of course, if the injection molding process is used, this ingenious idea of the die-cut mold design can be ignored. However, the thinner the sheet body 101, the more difficult the consistence of production. Both of the above designs have advantages and disadvantages.

Figure 6:
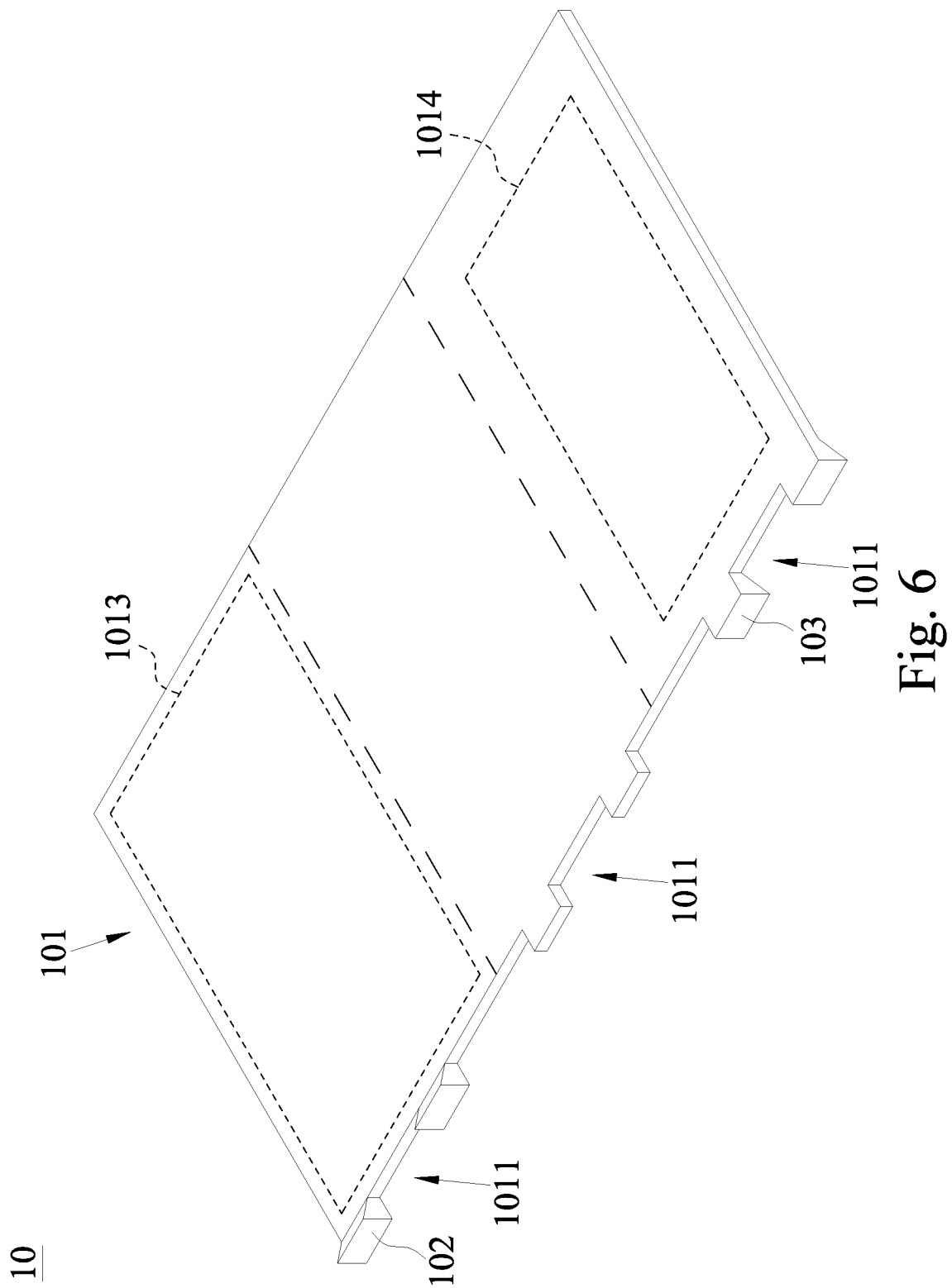
FIG. 6 is a schematic view of a light guide sheet before a sheet body is folded in half in accordance with a third embodiment of the present disclosure.
Figure 7:
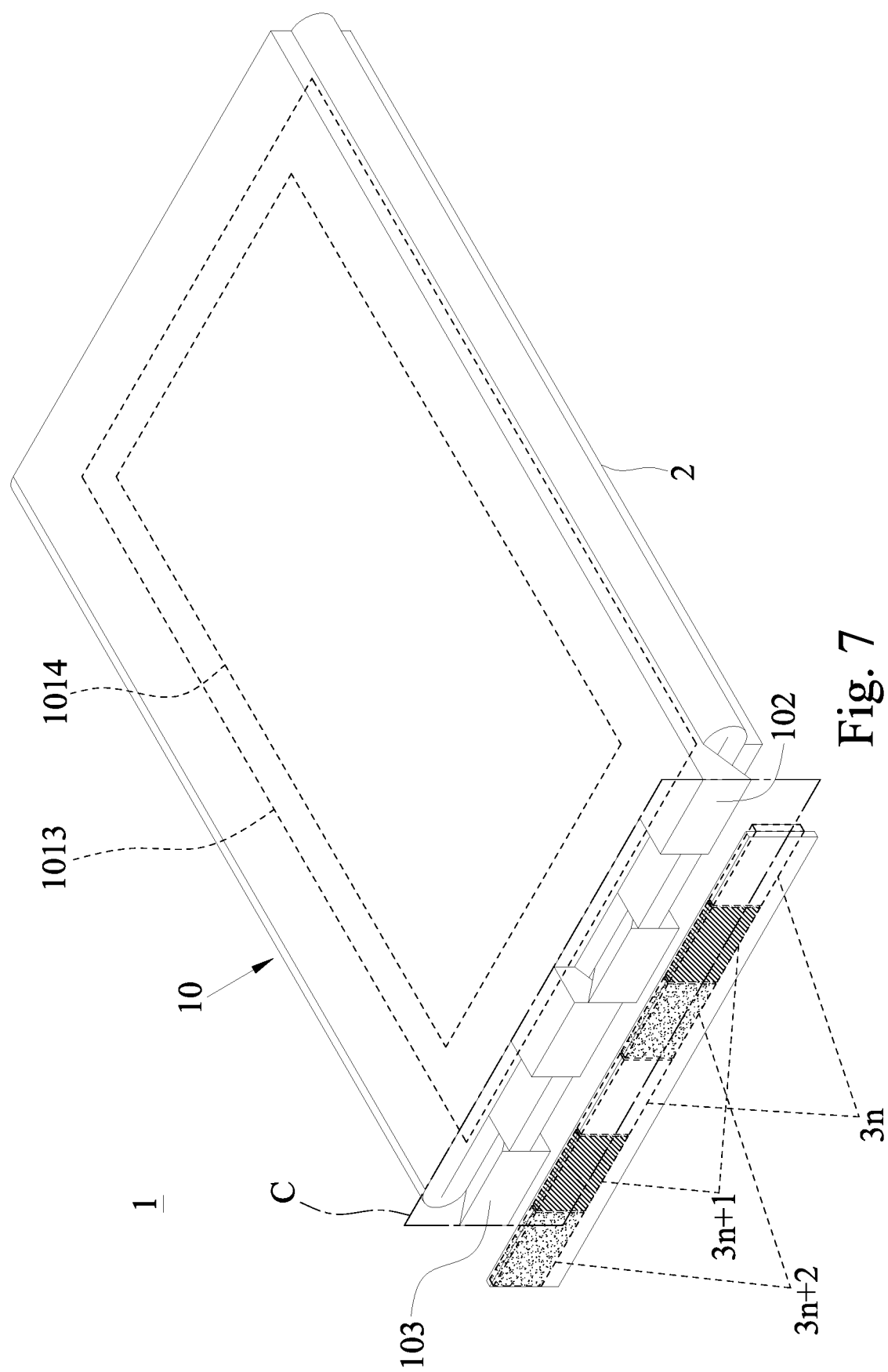
FIG. 7 is a schematic view of assembling a front light module in accordance with the third embodiment of the present disclosure.

With reference to FIGS. 6 and 7 for the schematic view of a sheet body of a light guide sheet before being folded in half and the schematic view of the assembly of a front light module in accordance with a third embodiment of the present disclosure respectively, based on the same technical idea, the sheet body 101 of the light guide sheet 10 can be folded in half, so that the two light receiving laterals 1011 are superimposed on each other on the same side and the first taper sets 102 and the second taper sets 103 form an incident plane A, or the sheet body 101 can also be divided into three parts to form a three-layer stacked structure after folding. In FIG. 6, the sheet body 101 has two fold lines 1012 and is divided into three equal parts, the sheet body 101 has three light receiving laterals 1011 configured to be adjacent to each other, the first taper sets 102 and the second taper sets 103 are located on at the positions of the two outermost light receiving laterals 1011, the part of the sheet body 101 corresponding to the first taper sets 102 is provided with the first pattern area 1013, and the part of the sheet body 101 corresponding to the second taper sets 103 is provided with the second pattern area 1014. The sheet body 101 is folded in a Z-shape along the fold lines 1012, such that the parts of the sheet body 101 located on left and right sides are located on the first and third layers respectively, and the first taper sets 102 and the second taper sets 103 are superimposed on each other on the same side to form an incident plane A. The middle area of the sheet body 101 is located at the position of the second-layer and folded to form a three-layer structured light guide sheet 10. The light receiving lateral 1011 located in the middle area, that is, the superimposed second-layer, can have a rectangular protruding structure as shown in the figure, and is staggered with the first taper sets 102 and the second taper sets 103 to form an incident plane A, and the part of the light bar 11 originally divided into an integer number n of parts is changed to two groups of odd and even numbers to have three groups, i.e. N=(3n, 3n+1, 3n+2) now. The first light source group 3n corresponds to the first taper sets 102, the third light source group 3n+2 corresponds to the second taper sets 103, and the second light source group 3n+1 conveniently and directly aligns with the second-layer light guide sheet to directly provide light toward the bump due to the main optical axis, so as to facilitate the display of the pattern area of each layer.

Since the second-layer is configured to be corresponsive to the main optical axis of the light source, it is not necessary to have the conical protruding structure to effectively receive the incident light, but a five-layer structure can be designed such that the middle three-layer light guide sheet is configured to be sequentially corresponsive to the three light source groups 5n+1, 5n+2, and 5n+3. In details, in the perspective of the light bar, the sequence of arranging the LEDs includes a first LED of the first light source group, a first LED of the second light source group, a first LED of the third light source group, a first LED of the fourth light source group, a first LED of the fifth light source group, a second LED of the first light source group, a second LED of the second light source group, a second LED of the third light source group, and so on and so forth. It is noteworthy that when independent light guide sheets are not used for the multi-sheet lamination but an elongated light guide sheet is used for folding, it is necessary to pay special attention to the relative positions of the divided light source groups on the light bar. If the position of each light incident group is directly marked on the elongated light guide sheet, it must be noted that the light incident structures on both left and right sides of the fold line are arranged opposite to each other.

Figure 8:
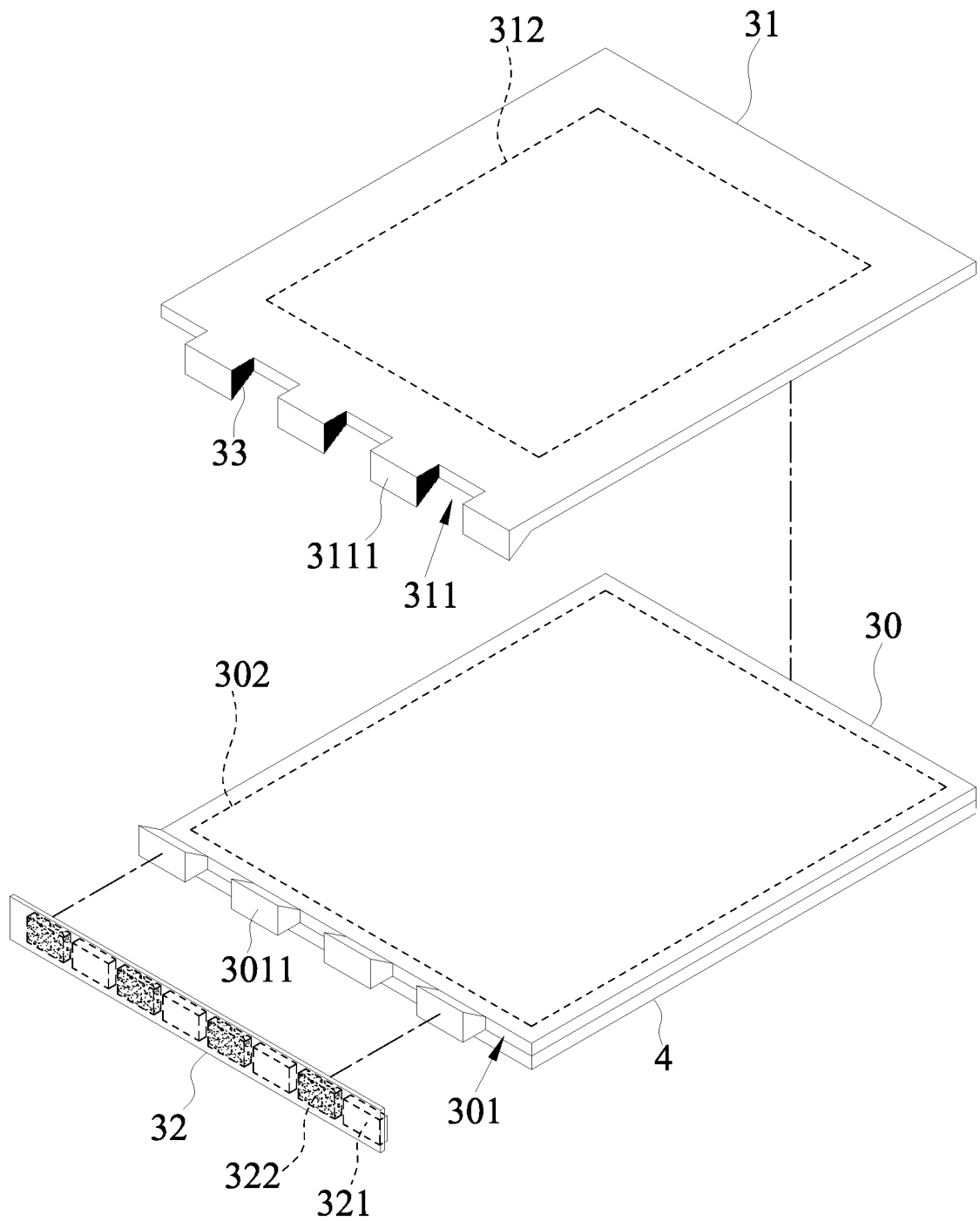
FIG. 8 is a schematic view of disassembling a front light module in accordance with a fourth embodiment of the present disclosure.
Figure 9:
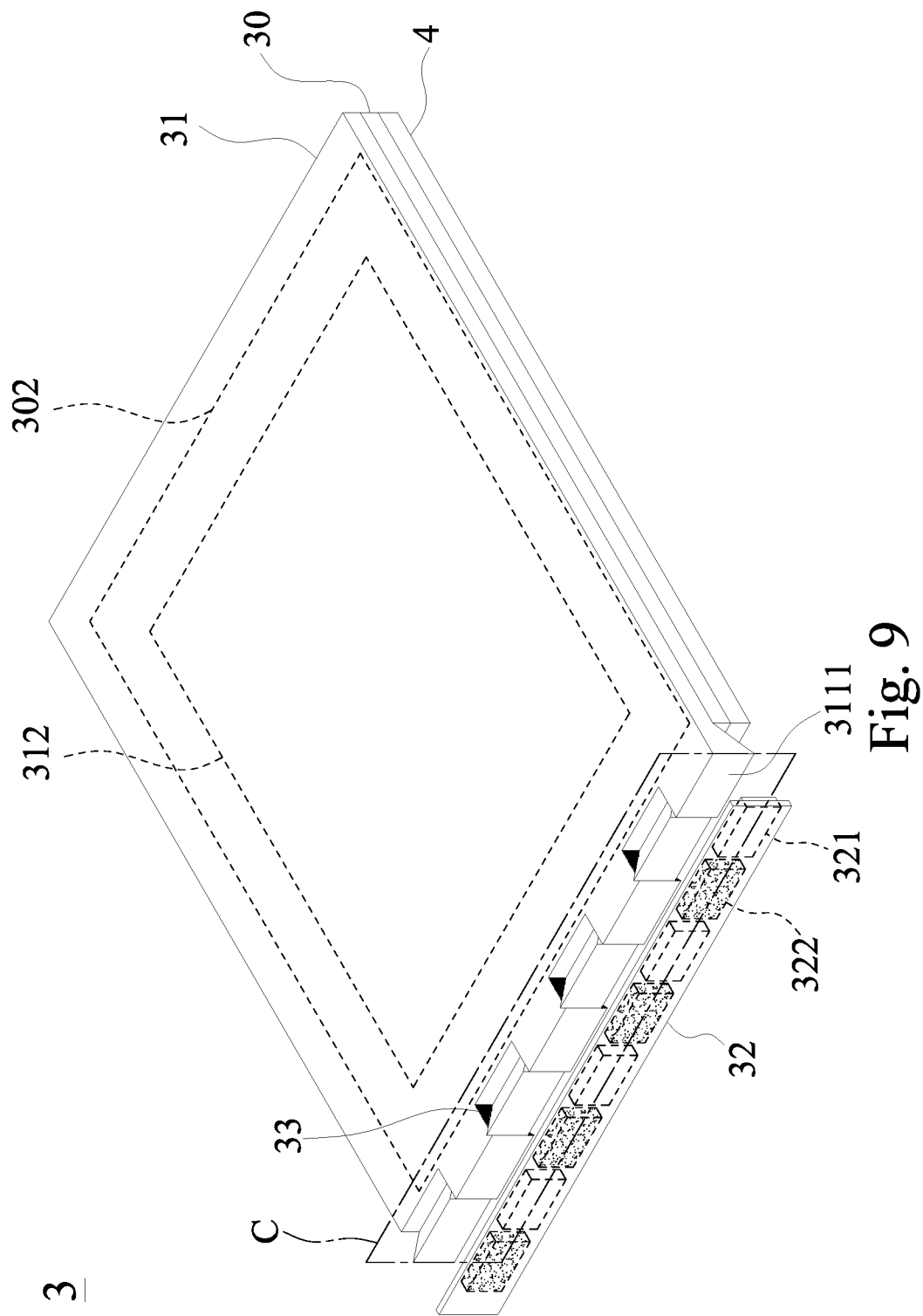
FIG. 9 is a schematic view of assembling a front light module in accordance with the fourth embodiment of the present disclosure.

With reference to FIGS. 8 and 9 for the exploded view and schematic view of a front light module in accordance with a fourth embodiment of the present disclosure respectively, based on the same technical concept, this embodiment also discloses a front light module 3 installed on a touch circuit substrate 4 and including a first light guide sheet 30, a second light guide sheet 31, and a light bar 32.

The first light guide sheet 30 is laid on the touch circuit substrate and includes a first light receiving lateral 301, and the first light receiving lateral 301 includes a plurality of first taper sets 3011, each being formed by protruding an edge of the first light receiving lateral 301, and a surface of the first light guide sheet 30 is provided with a first pattern area 302. The second light guide sheet 31 is located on the top of the first light guide sheet 30 and has a second light receiving lateral 311, the second light receiving lateral 311 and the first light receiving lateral 301 are located on the same side and include a plurality of second taper sets 3111, the second taper sets 3111 are formed by protruding an edge of the second light receiving lateral 311, and the second taper sets 3111 and the first taper sets 3011 are configured in a staggered manner to form an incident plane C. A surface of the second light guide sheet 31 is provided with a second pattern area 312. To stably superimpose the first light guide sheet 30 and the second light guide sheet 31 on each other, an optical adhesive is applied between the first light guide sheet 30 and the second light guide sheet 31 to enhance the bonding strength of the first light guide sheet and the second light guide sheet 31.

Figure 10:
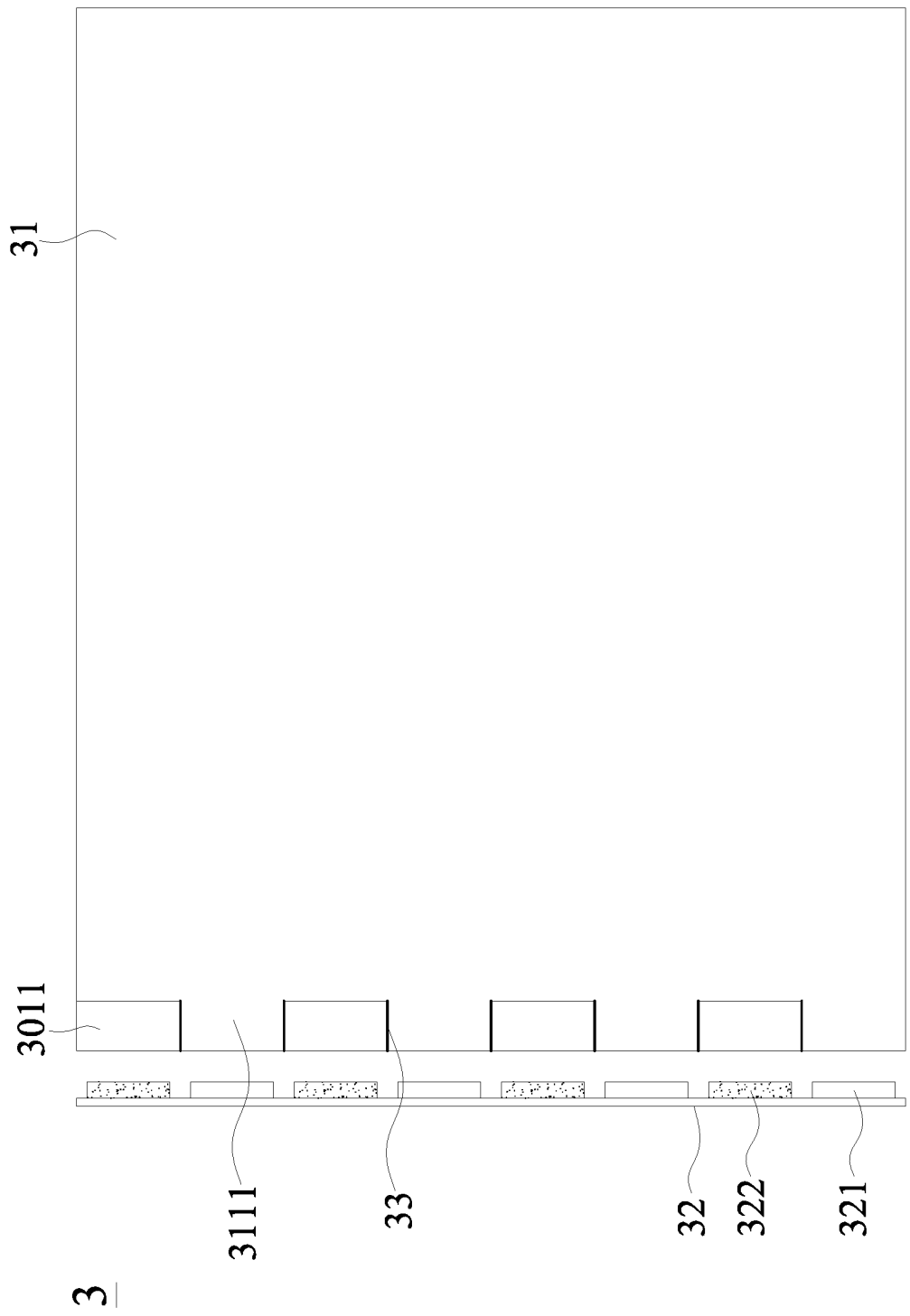
FIG. 10 is a plan view of a front light module in accordance with the fourth embodiment of the present disclosure.

The light bar 32 is formed by arranging an odd-positioned light source group 321 and an even-positioned light source group 322 to provide light toward the incident plane C, and the odd-positioned light source group 311 is configured to be corresponsive to the first taper sets 3011 and the even-positioned light source group 322 is configured to be corresponsive to the second taper sets 3111. In this way, when the odd-positioned light source group 321 functions, the light from the first taper sets 3011 lights up the first pattern area 302, and when the even-positioned light source group 322 functions, the light from the second taper sets 3111 lights up the second pattern area 312, so as to achieve the single-sided light incident effect and switch displaying different patterns. With reference to FIG. 10 for a plan view of a front light module in accordance with the fourth embodiment of the present disclosure, the correspondence relationship of the odd-positioned light source group 321 and even-positioned light source group 322 of the light bar 32 with the first taper sets 3011 and second taper sets 3111 respectively is shown.

Specifically, the first light guide sheet 30 and the second light guide sheet 31 are like those of the above-mentioned embodiment, which are also extremely thin sheet structures with a thickness of about 0.05 to 0.15 mm, and the thickness of the first taper sets 3011 and the second taper sets 3111 is about 0.25 mm-0.3 mm, which is still a very thin structure overall. The light bar 32 also has the odd-positioned light source group 321 and the even-positioned light source group 322 as described above to achieve the effect of displaying different pattern areas when different light sources are applied. Compared to traditional structures, the front light module 3 of this structure has the advantages of low manufacturing cost and excellent light output performance, and this structure is an alternative technical solution for the front light module with a plurality of display patterns for a touch panel to simplify components while maintaining light uniformity, brightness, and thin design.

To improve the display clarity of the first pattern area 302 and second pattern area 312, the front light module 3 further includes a plurality of light barriers 33 installed on at least one lateral side of each second taper sets 3111. The light barrier 33 is provided for effectively preventing a part of light from overflowing to the first taper sets 3011 or affecting the display clarity when the even-positioned light source group 322 functions. In other words, the light source groups at different positions do not interfere with each other, but can accurately light up the corresponding taper sets.

In a specific embodiment, the light barrier 33 is a lightproof glue or a black ink adhered to the second taper sets 3111 by coating. The lightproof glue can be, for example, a colloid mixed with black ink particles coated on the lateral side of the second taper sets 3111 and then cured afterward.

Since the thickness of the light guide sheet is much smaller than the light emitting area of the LEDs on the light bar, in the thoughts of two or more light guide sheets are provided on a light bar, it may not need the design of folding the same light guide sheet into half for the superimposition, but rather a plurality of light guide sheets is superimposed directly. In that case, the lowermost light guide sheet and the uppermost light guide sheet require the taper sets to guide the upward or downward light that deviates from the main light axis of the light bar via the taper sets correspondingly, and one to three ordinary light guide sheets without the plurality of taper sets can still be sandwiched between the lowermost and uppermost light guide sheets to receive the light that a near the main optical axis of the light bar via the laterals of each other. The ordinary light guide sheet only needs to cut out a light receiving lateral structure with a staggered groove-bump-groove configuration, and the groove formed on a side of the bump can be used to accommodate the upwardly protruding taper sets of the lowermost light guide sheet, and the groove on the other side of the bump can be used to accommodate the downwardly protruding taper sets of the uppermost light guide sheet. For example, in addition to the above two-layer stacked state, a relay light guide sheet or a third light guide sheet (not shown in the figure) can be added between the first light guide sheet 30 and the second light guide sheet 31, such that the front light module 3 defines a three-layer superimposition state, and the relay light guide sheet or the third light guide sheet is sandwiched between the first light guide sheet and the second light guide sheet, and an end is formed by arranging the light incident block and the plurality of accommodating grooves in a staggered manner (substantially the same as the middle structure as shown in FIG. 6, wherein the protruding portion is the light incident block and the recessed portion is the accommodating groove), one side of each light incident block is an accommodating groove provided for embedding one protrusion of the first taper sets 3011, and another side of the light incident block is also an accommodating groove provided for embedding one protrusion of the second taper sets 3111, so as to sequentially arrange many protrusions of the first taper sets 3011, the light incident blocks, and many protrusions of the second taper sets 3111 in a coplanar manner to form a light incident surface (as shown in FIG. 7, wherein the light incident block is located between the first taper sets 3011 and the second taper sets 3111, and the first taper sets 3011 and the second taper sets 3111 are embedded into the accommodating grooves respectively). Similarly, in a decorative or lighting application, the relay light guide sheet can be directly replaced by a reflective sheet. In the case of a stacked structure with three or more layers, a light barrier can also be included and sequentially installed between the adjacent first taper sets 3011, light incident block, and second taper sets 3111.

Figure 11:
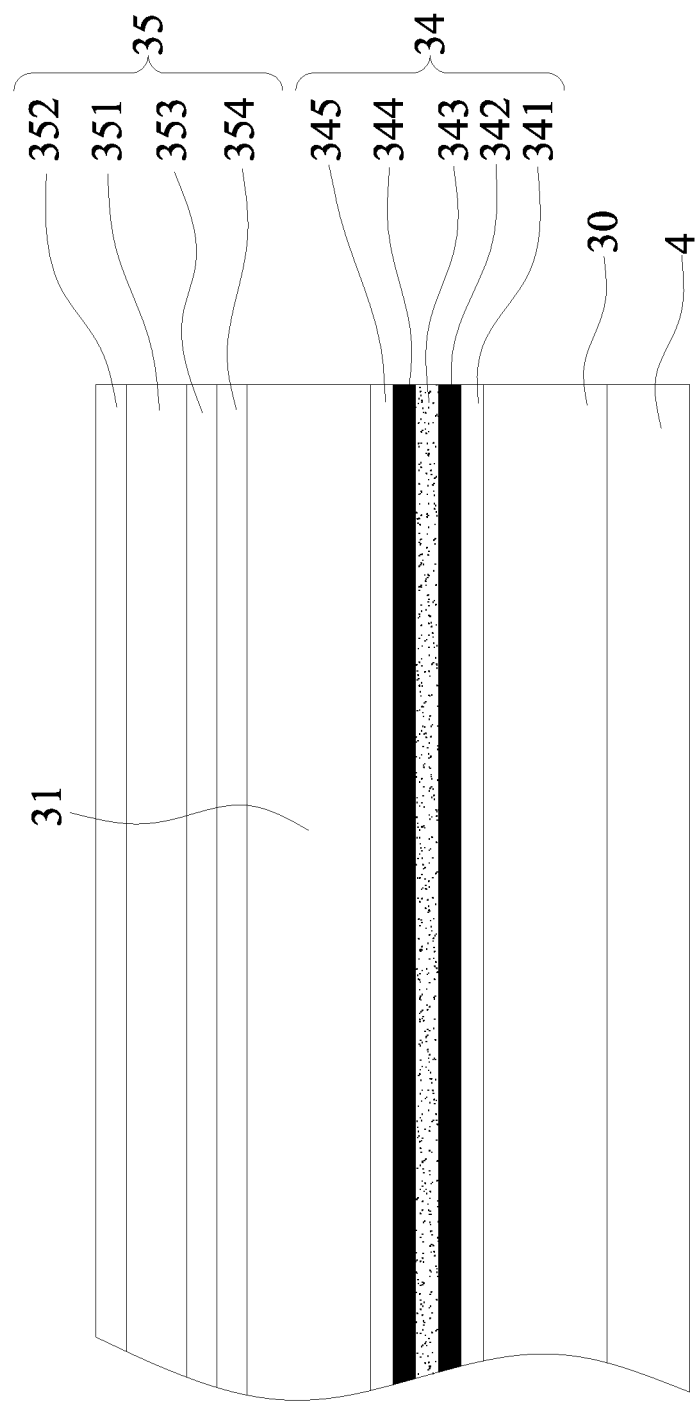
FIG. 11 is a partial cross-sectional view of a front light module in accordance with another implementation mode of the fourth embodiment of the present disclosure.

In FIGS. 9 and 11, FIG. 11 shows a partial cross-sectional view of another implementation mode of a front light module in accordance with the fourth embodiment of the present disclosure. Based on the aforementioned embodiment, the first light guide sheet 30 and the second light guide sheet 31 are installed closely with each other, while providing a blocking and sheltering effect of the display control to enhance the brightness and contrast of the light output. This embodiment discloses a front light module 3 which further includes a relay ink structure 34 installed between the first light guide sheet 30 and the second light guide sheet 31, and a relay ink structure 34 includes a first transparent ink layer 341, a first black ink layer 342, a transparent adhesive layer 343, a second black ink layer 344, and a second transparent ink layer 345 sequentially stacked from bottom to top. By this stacked structure, the bottom-layer structure can be sheltered effectively to enhance the brightness and contrast of the display when the light is outputted, and improve the display performance of the first pattern area 302 and second pattern area 312. In addition, the relay ink structure 34 can be replaced by a semi-penetrating reverse layer sandwiched between the first light guide sheet 30 and the second light guide sheet 31, which also shows excellent sheltering effect and display contrast.

In addition, when considering that the front light module 3 is placed in front of the panel and provided for users to directly view and touch the panel, and the display effect of the front light module 3 is optimized for direct viewing by the users in order to enhance the protection effect of the front light module 3, the front light module 3 further includes a multi-layered stack-structured protective cover 35 stacked on the second light guide sheet 31 and having a glass substrate 351, a sputtering layer 352, an anti-glare film layer 353, and a reflective layer 354, a sputtering layer 352 disposed on the upper surface of the glass substrate 351, an anti-glare film layer 353 disposed on the lower surface of the glass substrate 351, and a reflective layer 354 disposed under the anti-glare film layer 353, so as to achieve the aforementioned effects. Actually, the relay ink structure 34 and the multi-layered stack-structured protective cover 35 are relatively thinner structures, especially the relay ink structure 34. However, for the purpose of illustration, the contents of FIG. 9 are represented by enlarging the area of the first light receiving lateral 301 and the area of the second light receiving lateral 311 relative to the first light guide sheet 30 and the second light guide sheet 31 to illustrate the above structural characteristics more clearly.

In summation of the description above, the terminals engaged light guide plate and its front light module in accordance with the present disclosure provide a technical solution for the single-sided incident light and the display of different patterns, so as to achieve the effects of effectively simplifying the required components in the overall structure, reducing size and manufacturing cost, and maintaining excellent light output performance. The light guide sheet of the front light module is a thin sheet using the first taper sets and the second taper sets located on the same side and arranged in a staggered manner as the primary light receiving structure, in conjunction with the control of the function of the odd-positioned light source group and the even-positioned light source group, to light up the first pattern area or the second pattern area. The first taper sets and the second taper sets located on the same side can be formed by folding the light guide sheet in half and superimposing the light receiving laterals, or formed by the vertically stacked first light guide sheet and second light guide sheet, thereby providing a convenient and efficient manufacturing process. Further, the present disclosure provides additional technical characteristics, such as the first taper sets group and the second taper sets group which are conical structures formed by cutting a light receiving lateral by a die-cut mold, and can be manufactured more easily. A multi-layered stack-structured protective cover can be installed to enhance the protection and optimize the display effect. The first light guide sheet and the second light guide sheet can be vertically stacked with each other, a relay ink structure can be installed between the first and second light guide sheets, and the first and second light guide sheets can be fixedly adhered with each other in order to form a shelter structure to improve the brightness and contrast of the light output.

What is claimed is:

1. A front light module, installed on a touch circuit substrate, comprising:
    a first light guide sheet, laid on the touch circuit substrate, and having a first light receiving lateral, a first light receiving lateral having a plurality of first taper sets formed by protruding from an edge of the first light receiving lateral, and a first pattern area defined on a surface of the first light guide sheet;
    a second light guide sheet, superimposed on the first light guide sheet, and having a second light receiving lateral, the second light receiving lateral having a plurality of second taper sets formed by protruding from an edge of the second light receiving lateral, an incident plane formed by engaging the second taper sets with the first taper sets, and a second pattern area defined on a surface of the second light guide sheet; and
    a light bar, formed by arranging an odd-positioned light source group and an even-positioned light source group for providing light toward the incident plane, the odd-positioned light source group being configured to be corresponsive to the first taper sets, and the even-positioned light source group being configured to be corresponsive to the second taper sets,
    wherein, when the odd-positioned light source group functions, the first pattern area is lit by light from the first taper sets, and when the even-positioned light source group functions, the second pattern area is lit by light from the second taper sets, and
    the first light guide sheet and the second light guide sheet are formed by bending a sheet body, the sheet body has a fold line, the first pattern area and the second pattern area are located on two sides of the fold line respectively, the first light receiving lateral and the second light receiving lateral are located on two opposite sides of the fold line respectively, and the fold line is perpendicular to the first light receiving lateral and the second light receiving lateral.

2. The front light module according to claim 1, further comprising a plurality of light barriers located on at least one lateral side of each of the second taper sets.

3. The front light module according to claim 1, further comprising a semi-penetrating reverse layer sandwiched between the first light guide sheet and the second light guide sheet.

4. A front light module, installed on a touch circuit substrate, comprising:
    a first light guide sheet, laid on the touch circuit substrate, and having a first light receiving lateral, a first light receiving lateral having a plurality of first taper sets formed by protruding from an edge of the first light receiving lateral, and a first pattern area defined on a surface of the first light guide sheet;
    a second light guide sheet, superimposed on the first light guide sheet, and having a second light receiving lateral, the second light receiving lateral having a plurality of second taper sets formed by protruding from an edge of the second light receiving lateral, an incident plane formed by engaging the second taper sets with the first taper sets, and a second pattern area defined on a surface of the second light guide sheet; and
    a light bar, formed by arranging an odd-positioned light source group and an even-positioned light source group for providing light toward the incident plane, the odd-positioned light source group being configured to be corresponsive to the first taper sets, and the even-positioned light source group being configured to be corresponsive to the second taper sets,
    wherein, when the odd-positioned light source group functions, the first pattern area is lit by light from the first taper sets, and when the even-positioned light source group functions, the second pattern area is lit by light from the second taper sets, and
    the first light guide sheet and the second light guide sheet are formed by bending a sheet body, the sheet body has a fold line, the first pattern area and the second pattern area are located on two sides of the fold line respectively, and the fold line is parallel to the first light receiving lateral and the second light receiving lateral.

5. The front light module according to claim 4, further comprising a plurality of light barriers located on at least one lateral side of each of the second taper sets.

6. The front light module according to claim 4, further comprising a semi-penetrating reverse layer sandwiched between the first light guide sheet and the second light guide sheet.

* * * * *